Figure 1:
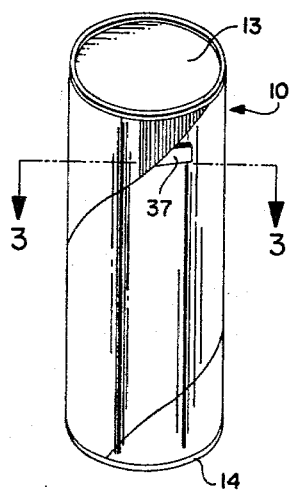

March 23, 1965

P. W. STUMP ETAL 3,174,676

CONTAINER

Filed Sept. 30, 1963

INVENTOR.
PAUL W. STUMP
JOSEPH STOLARICK

BY

*Watts & Fisher*

ATTORNEY

United States Patent Office 3,174,676
Patented Mar. 23, 1965

3,174,676
CONTAINER
Paul W. Stump, North Olmsted, Ohio, and Joseph Stolarick, Irving, Tex., assignors to Cleveland Container Corp., Cleveland, Ohio, a corporation of Delaware
Filed Sept. 30, 1963, Ser. No. 312,589
7 Claims. (Cl. 229—51)

This application is a continuation-in-part of application Serial No. 177,419, filed March 5, 1963, now U.S. Patent No. 3,113,714, to Paul W. Stump, and entitled Container.

The present invention relates generally to containers and more specifically relates to wound fiber containers.

In packaging products such as ready-to-cook biscuits, the problem is to provide a container which has walls of sufficient strength to retain the product and a container which at the same time can be opened easily. With leavened dough and other products, removable end enclosures are not a satisfactory solution because one is not able to completely remove the contents, at least not without deforming the dough products.

One fiber container which has solved these and other problems is described and claimed in co-pending application Serial No. 177,419.

The present invention provides a container tube having an inner liner ply and a structure ply wound around the liner ply. The edges of the structure ply are in an abutting relation and define a seam extending from one end of the container to the other. A strip of reinforcing material extends longitudinally along the seam and is secured to the structure ply on each side of the abutting edges. The strip of reinforcing material maintains the abutting edges together providing reinforcing which serves as a second structure ply although it is not a complete ply. The liner ply, the structure ply, and the reinforcing strip provide a three ply construction having adequate wall strength to hold and protect the contents of the container. A label is tightly wound and secured to the outer structure ply. The function of the label is primarily to decorate the tube. The label as secured to the structure ply additionally gives strength to the container especially against bursting forces. The furnish of the material of the label secured to the tube is substantially the same as and compatible with the material of the reinforcing material so that the same frangible connection is provided between them and the structure ply.

A pull tab extends under the label and between the reinforcing strip of material and the structure ply and is bonded to at least the strip of reinforcing material. Removal of the label and the reinforcing strip is facilely accomplished by grasping and pulling the tab back against the label and the reinforcing strip. When the label and the reinforcing strip are removed, it is then only necessary to rupture the inner liner to accomplish removal of the contents of the container.

Accordingly, an object of the present invention is to provide a new and improved container tube wherein a seam of the inner tube wall is reinforced and the reinforcement is facilely removed.

Another object of the present invention is to provide a new and improved container tube wherein a seam of the tube is reinforced and the reinforcement is facilely removed by pulling a connected pull tab.

A further object of the present invention is to provide a new and improved container wherein a decorative label ply is facilely removable by means of a connected pull tab and wherein the seam of a structure ply is reinforced and such reinforcement is also facilely removed by means of the pull tab to permit the container wall to be opened.

Figure 2:
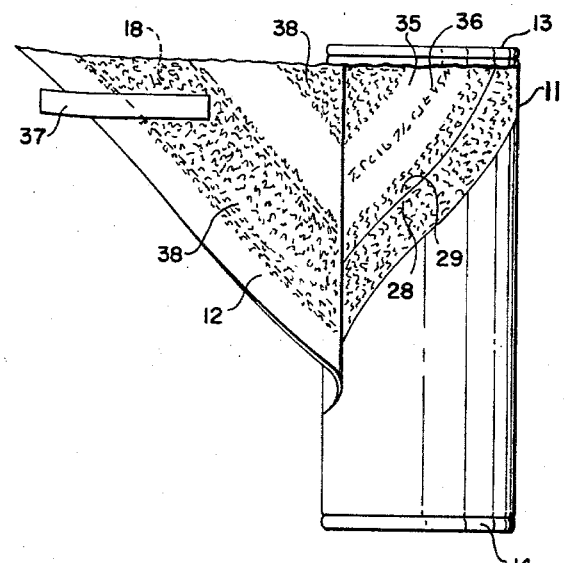
Figure 3:
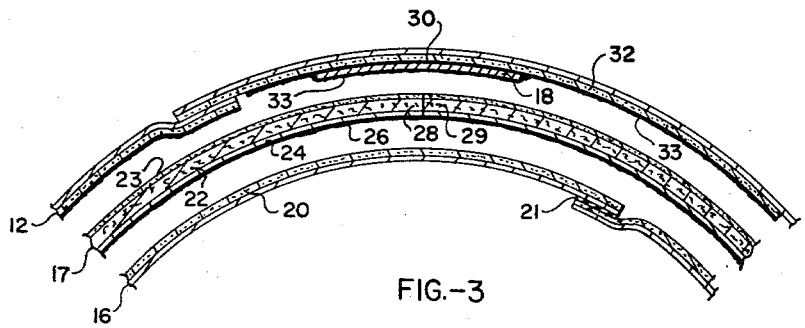
Figure 4:
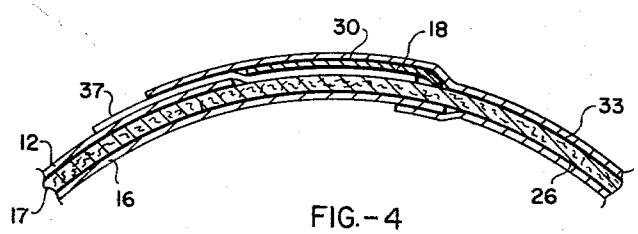

Other objects and a fuller understanding of the invention may be had by referring to the following description and claims taken in conjunction with the accompanying drawing in which:

In the drawing:
FIGURE 1 is a perspective view of the container of the invention;
FIGURE 2 is an elevational view of the container showing the outer label ply and a reinforcement material strip partially removed;
FIGURE 3 is an exaggerated and exploded but foreshortened view, in detailed section, of a wall of a container employing the present invention; and,
FIGURE 4 is a sectional view in abbreviated detail showing the pull tab arrangement of the present invention.

Referring now to the drawing which shows the preferred embodiment of the invention, a container is indicated generally by the reference character 10. The container 10 comprises a central tube 11 which is surrounded by a decorative label 12. Suitable end enclosures 13, 14 are secured to the ends of the covered central tube 11.

The disclosed central tube 11 is one which is especially designed for ready opening once the label 12 is removed. While as will be apparent, other tubes are suitable for use for this invention, the disclosed tube 11 is preferred and, accordingly, will be described with some detail.

The central tube 11 has essentially three plies on which the outer label 12 is wound to provide a decorative cover for the container 10. The three plies include an innermost ply 16 which forms a liner for the tube, an intermediate structure ply 17 which is essentially the supporting structure for the container tube wall, and a strip of reinforcing material 18 which forms a reinforcing ply although it is not a complete ply. All of the plies are spirally wound. The adjacent margins or edges of the liner ply 16, the structure ply 17, and the outer label 12, define helical seams extending from one end of the tube 11 to the other. As the seams of the liner and structure plies 16, 17 constitute the weakened portions of their respective plies, they are circumferentially separated or spaced so as to not overlie one another. Circumferentially disposed in this manner, the seams do not greatly affect the hoop strength of the container.

The innermost ply 16 is a moisture-proof liner for the tube and is a metal foil with a kraft paper backing 20. The liner ply 16 is spirally wound with its edges in an overlapping relation and an adhesive 21 is applied between the overlapping edges.

The structure ply 17 has a chipboard layer 22 for supporting strength. The chipboard 22 is lined with newspaper stock 23 in a layer on one side and a kraft paper 24 in a layer on the other side. The newspaper stock 23, or "news liner," as it is more commonly called, may be .007 inch thick. A combined thickness of the news liner 23, the chipboard 22, and the kraft paper 24 of .032 inch has been found satisfactory for containers. The structure ply 17 which is between the liner ply 16 and the label 12 is spirally wound around the liner ply 16 so that the kraft paper layer 24 is adjacent the kraft paper backing 20. The kraft paper backing 20 and the layer 24 are bonded together by an adhesive 26 of a water emulsion, resinous type.

Edges 28, 29 of the structure ply 17 are in an abutting relation and define a helical seam extending from one end of the tube to the other. The liner 16 and the strip of reinforcing material 18 serve to maintain the edge 28, 29 in their abutting relation.

The wall of the central tube 11 is strengthened by the reinforcing strip 18 which extends longitudinally along the helical seam defined by the edges 28, 29 of the intermediate ply 17. An adhesive 30 bonds the reinforcing strip to the label 12. An adhesive 33 secures the reinforcing strip 18 to the portions of the intermediate ply 17 adjacent each of the abutting edges 28, 29.

A preferred reinforcing material is a northern kraft paper, machine grade, which is manufactured by Thilmany Pulp & Paper Company, Kaukauna, Wisconsin, under the mark "Tuftwet." A northern kraft paper having a 40 lb. wet strength has been found satisfactory for strengthening the container. This preferred kraft paper has a different finish on each side. The finish on one side is rougher, relatively speaking, than the finer finish on the other side. The rougher finished side of the reinforcing strip 18 is adhesively connected to the news liner 23 by the adhesive 33.

The label 12 is spirally wound around the structure ply 17 and the reinforcing strip 18 to cover and decorate them. The label ply 12 has a kraft paper backing 32 which, in the preferred form of the container shown, is the same kraft paper material used for the reinforcing strip 18. The kraft paper backing 32 is on the label ply 12 with its rougher finish toward the news liner 23. The adhesive 33 bonds the kraft paper backing 32 of the label 12 to the news liner 23 of the tube 11 over substantially the entire interface between them except for a helical area 35 on the tube 11 which area presents instructive indicia 36 for further opening of the container after the label is removed.

The adhesive 33 is a water emulsion, resinous type having a low solid content. The adhesive 33 provides a frangible connection of the label 12 and the reinforcing strip 18 to the tube 11 so that they are easily peeled from the tube 11. As the news liner 23 is soft, softer than the kraft paper backing 32, it tears easily, further facilitating the removal of the outer label 12 and the reinforcing strip 18, and forms a part of the frangible connection.

In the above description it is to be noted that the kraft paper backing 32 and the reinforcing strip 18 are of the same material so that the furnish of one is compatible with the furnish of the other. Also, they are oriented so that both present the same finished side to the news liner 23. The adhesive 33 thus forms the same frangible connection between them and the news liner 23.

In the preferred form of the container shown, the adhesive 30 is of a water emulsion, resinous type similar to the adhesive 33. Because of the relative orientation of the finished sides of the reinforcing strip 18 and of the kraft paper backing 32, a secure connection is provided between the kraft paper backing 32, and the reinforcing strip 18 by the adhesive 30, in comparison to the frangible connection between them and the news liner 23. The bond between the label 12 and the reinforcing strip 18 is therefore stronger than the bond between the reinforcing strip and the tube 11.

To open the container for removal of its contents, the label 12 is first removed. To further facilitate opening the container, the reinforcing strip of material 18 is removed with the label 12 through the provision of a short pull tab 37. FIGURE 2 illustrates the arrangement of the pull tab 37, the label 12, and the reinforcing strip 18 as they are removed from the container tube 11.

The pull tab 37 is made preferably of a relatively stiff material of high tensile, and shear strength, as for example, an acetate rayon. As shown best in FIGURE 4, the pull tab 37 extends under the label 12 and between the reinforcing strip 18 and the intermediate structure ply 17. The pull tab 37 is secured to the reinforcing strip 18 and to the label 12 by the adhesive. The pull tab 37 extends through the helical seam of the label 12 and projects a short distance beyond so that it may be easily grasped. The portion of the pull tab 37 extending under the label 12 has a length substantially less than the circumferential dimension of the label 12 and of the container tube at the location of the pull tab 37. Thus, to open the container, one grasps the pull tab 37 and pulls it back tearing the decorative label 12 from the tube 11 and away from the end enclosure 13. Pulling the pull tab 37 back also tears the reinforcing strip 18 from the inner tube 11. Once the label 12 and the reinforcing strip 18 have been started in this manner, they are easily grasped and completely removed from the tube 11. Removal of the label 12 and the reinforcing strip 18 is essentially together and facilitated by a separation in the frangible connection provided by the adhesive 33 and by the news liner 23 so that parts of the news liner 23 are removed with the label 12. The fibers of the news liner removed with the label 12 are indicated generally by the reference character 38 in FIGURE 2. The removed fibers 38 partially cover the reinforcing strip which strip 18 is shown in broken lines. Removing the outer label 12 and the reinforcing strip 18 exposes the helical seam formed by the abutting edges 28, 29. The liner ply 16 remaining to hold the abutting edges 28, 29 together to form the seam is easily fractured and the container is then easily opened by twisting its ends in opposite directions.

In conclusion, the present invention may be briefly described as comprising essentially an easily opened container having a structure ply wound to provide a tube with the edges of the structure ply in an abutting relation, a reinforcing strip of material extending along the seam formed by the abutting edges, a label ply wound around the tube and the reinforcing material, the furnishes of the label and of the reinforcing material being compatible, an adhesive securing the reinforcing material and the label to the tube and providing a frangible connection between both the label and the reinforcing material and the structure ply, and a pull tab having a first portion extending under the label and between the reinforcing material and the inner ply and a second portion extending out from under the label ply and projecting beyond the seam of the label ply so as to be grasped for pulling the label ply and the reinforcing material from the container.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A container comprising:
 (a) a structure ply of relatively rigid material wound with its edges in an adjacent relation to provide a container tube;
 (b) a reinforcing strip of material extending over the seam defined by the adjacent edges of the structure ply;
 (c) an outer label of relatively flexible material wound around said structure ply and said reinforcing strip, the furnish of the side of the label presented to the structure ply being compatible with the furnish of the side of the reinforcing strip presented to the structure ply;
 (d) means bonding the presented sides of the label and the reinforcing strip to the structure ply and forming an easily frangible connection between such presented sides and the structure ply; and,
 (e) pull tab means having a first portion extending under the label and being connected to said reinforcing strip and a second portion extending through the seam of the label and overlying a portion of the outer surface of the label.

2. The combination of claim 1 wherein the label has a backing of kraft paper material which is also the material for the reinforcing strip.

3. The combination of claim 2 wherein the tube includes an outer newspaper layer, and the bonding means is a resinous adhesive having a low solid content and bonds the newspaper layer to the kraft paper backing and to the kraft paper reinforcing strip.

4. A container comprising:
(a) an inner ply of relatively rigid material wound with its edges in an adjacent relation to provide a container tube;
(b) a reinforcing strip of material extending over the seam defined by the adjacent edges of the inner ply, adhesive means bonding the reinforcing strip of material to the inner ply on each side of the seam;
(c) an outer label of relatively flexible material wound around said inner ply, said label having edges defining a seam extending from one end of the tube to the other and being circumferentially spaced from the seam of the inner ply;
(d) a pull tab having a first portion extending under the label and between the reinforcing material and the inner ply and a second portion extending through the seam of the label and overlying a portion of the outer surface of the label;
(e) means bonding said pull tab to said reinforcing material; and,
(f) end enclosures secured to the ends of the tube to complete the container.

5. A container comprising:
(a) an inner ply of relatively rigid material wound with its edges in an abutting relation to provide a container tube;
(b) a reinforcing strip of material extending longitudinally over the seam defined by the abutting edges of the inner ply, adhesive means bonding the reinforcing strip of material to the inner ply on each side of the seam;
(c) an outer label of relatively flexible material wound around said inner ply, said label having edges defining a seam extending from one end of the tube to the other and being circumferentially spaced from the seam of the inner ply;
(d) a pull tab having a first portion extending under the label and between the reinforcing material and the inner ply and a second portion extending through the seam of the label and overlying a portion of the outer surface of the label;
(e) said adhesive means bounding said pull tab to said reinforcing material;
(f) the first portion of said pull tab extending circumferentially of the tube and having a length substantially less than the circumferential dimension of the label at the location of the pull tab, and the second portion extending beyond the seam of the label so as to be easily grasped; and,
(g) end enclosures secured to the ends of the tube to complete the container.

6. A container comprising:
(a) an inner ply of relatively rigid material spirally wound to provide a container tube with the edges of the inner ply in an abutting relation and defining a helical seam extending from one end of the tube to the other;
(b) a reinforcing strip of material extending longitudinally substantially the entire length of the helical seam of the inner ply, adhesive means bonding said reinforcing strip to the surface portions of the inner ply adjacent said helical seam;
(c) a label of relatively flexible material spirally wound around said inner ply, said label having edges defining a helical seam extending from substantially one end of the tube to the other and being spaced circumferentially from the helical seam of said inner ply;
(d) a pull tab extending circumferentially of the tube near one end of the tube, said pull tab having a length substantially less than the circumferential dimension of the label at the location of the pull tab, a first portion of the pull tab extending under the label and between the reinforcing strip and the inner ply, said adhesive means securing said reinforcing strip to the first portion of said pull tab, and a second portion of second pull tab extending through the helical seam of said label and overlying a portion of the outer surface of the label; and,
(e) end enclosures secured to the ends of the tube to complete the container, whereby said pull tab is grasped and pulled back against the label and the reinforcing strip to tear the label from the near end enclosure and the reinforcing strip from its bonded connection to the inner ply.

7. A container comprising:
(a) a liner ply wound to form a tube;
(b) a structure ply of relatively rigid material spirally wound around said liner ply with the edges of the structure ply in an abutting relation;
(c) said structure ply including a soft news liner on its entire outer most surface;
(d) a thin strip of reinforcing material extending longitudinally along the helical seam defined by the abutting edges of the structure ply;
(e) means bonding said reinforcing strip to said structure ply on both sides of said helical seams;
(f) a label ply having a kraft paper backing spirally wound around said structure ply with the kraft paper adjacent said news liner, the edges of said label ply defining a helical seam extending from substantially one end of the tube to the other and being spaced circumferentially from the helical seam of said structure ply, and said label ply being substantially continuous and unbroken throughout its entire extent;
(g) said adhesive bonding said kraft paper backing to said news liner throughout their entire contiguous extend except for indicia surface portions;
(h) said adhesive and said news liner providing an easily frangible connection between said structure ply on one part and the label and the reinforcing material on the other part;
(i) a pull tab having a first portion extending under the label ply and between the reinforcing material and the structure ply near one end of the tube and a second portion extending through the helical seam and overlying a portion of said pull tab extending circumferentially of the tube having a length substantially less than the circumferential dimension of the label ply at the location of the pull tab, and the second portion extending through the seam of the label ply and extending beyond the seam so as to be easily grasped; and,
(j) end enclosures secured to the ends of the tube to complete the container.

References Cited by the Examiner
UNITED STATES PATENTS

| 2,793,126 | 5/57 | Fienup et al. | 229—51 |
| 2,793,127 | 5/57 | Geist et al. | 229—51 |
| 2,795,366 | 6/57 | Magill | 229—51 |
| 2,891,714 | 6/59 | Vallas | 229—51 |
| 3,042,285 | 7/62 | Smith | 229—51 |
| 3,109,576 | 11/63 | Karl | 229—51 |
| 3,113,714 | 12/63 | Stump | 229—51 |

FOREIGN PATENTS 900,439  7/62  Great Britain.

FRANKLIN T. GARRETT, *Primary Examiner.*